(12) United States Patent
Archer et al.

(10) Patent No.: US 9,418,230 B2
(45) Date of Patent: Aug. 16, 2016

(54) AUTOMATED TOOLS FOR BUILDING SECURE SOFTWARE PROGRAMS

(71) Applicants: Myla M. Archer, Alexandria, VA (US); Constance L. Heitmeyer, Washington, DC (US); Elizabeth I. Leonard, Silver Spring, MD (US); Carolyn B. Gasarch, Silver Spring, MD (US); Wei Ding, Boston, MA (US)

(72) Inventors: Myla M. Archer, Alexandria, VA (US); Constance L. Heitmeyer, Washington, DC (US); Elizabeth I. Leonard, Silver Spring, MD (US); Carolyn B. Gasarch, Silver Spring, MD (US); Wei Ding, Boston, MA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 14/163,523

(22) Filed: Jan. 24, 2014

(65) Prior Publication Data
US 2014/0208431 A1    Jul. 24, 2014

Related U.S. Application Data

(60) Provisional application No. 61/756,072, filed on Jan. 24, 2013.

(51) Int. Cl.
    *G06F 11/36*      (2006.01)
    *G06F 21/57*      (2013.01)

(52) U.S. Cl.
    CPC ........ *G06F 21/577* (2013.01); *G06F 2221/033* (2013.01)

(58) Field of Classification Search
    CPC ....................................................... G06F 11/36
    See application file for complete search history.

(56) References Cited

U.S. PATENT DOCUMENTS 6,006,328 A * 12/1999 Drake .............................. 726/23
2006/0271890 A1* 11/2006 Hekmatpour et al. ............ 716/5
2011/0197180 A1* 8/2011 Huang et al. ................... 717/126

OTHER PUBLICATIONS

Amtoft, T., Hatcliff, J., Rodriguez, E., "Precise and Automated Contract-Based Reasoning for Verification and Certification of Information Flow Properties of Programs with Arrays," in ESOP 2010 Proceedings of the 19th European conference on Programming Languages and Systems, vol. 6012, pp. 43-63. Springer, Heidelberg (Mar. 2010).

Archer, M., Leonard, E., "Establishing high confidence in code implementations of algorithms using formal verification of pseudocode," in: Proc. 3rd International Verification Workshop (VERIFY 2006), Seattle, WA (Aug. 2006).

(Continued)

*Primary Examiner* — Josnel Jeudy
(74) *Attorney, Agent, or Firm* — US Naval Research Laboratory; Richard F. Bis (57) ABSTRACT

A computer implemented tool is described that includes an assertion generator module that can automatically generate assertions, which are usable to verify application-specific security properties, for a computer software program. An assertion checker module can automatically analyze the computer software program to ensure that it satisfies the application-specific security properties. A graphical user interface module can display feedback to diagnose security flaws detected in the computer software program based on the analysis by the assertion checker module. In support of these modules are a code preprocessor module that can translate source code of the computer software program into an intermediate abstract representation, and a database module that can store the generated assertions and associated data in a database. Each of the modules can provide functionality at any time during code construction of the computer software program.

22 Claims, 3 Drawing Sheets

(56) References Cited

OTHER PUBLICATIONS

Barnett, M., Chang, B.-Y.E., Deline, R., Jacobs, B., Leino, K.R.M., "Boogie: A Modular Reusable Verifier for Object-Oriented Programs," in 4th International Symposium, FMCO 2005, Amsterdam, The Netherlands, Nov. 1-4, 2005. LNCS, vol. 4111, pp. 364-387, Nov. 2005.

Bergeretti, J.-F., Carre, B.A., "Information-flow and data-flow analysis of while-programs." ACM Trans. Prog. Lang. Syst. 7(1), 37-61, Jan. 1985.

Bernardy, J.-P., "Lazy functional incremental parsing." in: Proc. of Second ACM SIGPLAN Symposium on Haskell, pp. 49-60, Sep. 2009.

Engler, D., Musuvathi, M., "Static Analysis versus Software Model Checking for Bug Finding." in: Steffen, B., Levi, G. (eds.) VMCAI 2004. LNCS, vol. 2937, pp. 191-210, Jan. 2004.

Flanagan, C., et al., "Extended static checking for Java." in: PLDI 2002 Proc. of the ACM SIGPLAN 2002 Conf. on Prog. Lang. Design and Implem., pp. 234-245, Jun. 2002.

Gannod, G.C., Cheng, B.H.C., "Strongest postcondition semantics as the formal basis for reverse engineering." Proceedings of 2nd Working Conference on Reverse Engineering, pp. 188-197, Jul. 1995.

Ghezzi, C., Mandrioli, D., "Incremental parsing." ACM Transactions on Programming Languages and Systems 1(1), 58-70, Jul. 1979.

Heitmeyer, C., Archer, M., Leonard, E., McLean, J., "Formal specification and verification of data separation in a separation kernel for an embedded system." in: Proc. 13th ACM Conf. on Comp. and Comm. Sec. (CCS), pp. 346-355, Nov. 2006.

C. Heitmeyer, M. Archer, E. Leonard, and J. McLean, "Applying formal methods to a certifiably secure software system", IEEE Trans. on Softw. Eng., 34(1), Jan./Feb. 2008.

Yip, A., Wang, X., Zeldovich, N., Kaashoek, M.F., "Improving application security with data flow assertions." in: Proc. ACM SIGOPS 22nd Symp. Oper. Sys. Prin., SOSP 2009, pp. 291-304, Oct. 2009.

G. Necula, S. McPeak, S. P. Rahul, and W. Weimer, "CIL: Intermediate language and tools for analysis and transformation of C programs", in Proc. 11th Int'l Conf. on Compiler Construction (CC 2002), LNCS 2304, pp. 213-228, Apr. 2002.

D. Evans and D. Larochelle, "Improving Security Using Extensible Lightweight Static Analysis", IEEE Software 19(1), Jan./Feb. 2002.

Y. Moy and C. Marché, "Modular inference of subprogram contracts for safety checking", J. Symb. Comput., 45(11), pp. 1184-1211, Nov. 2010.

E. Cohen, M. Dahlweid, M. A. Hillebrand, D. Leinenbach, M. Moskal, T. Santen, W. Schulte, and S. Tobies, "VCC: A Practical System for Verifying Concurrent C", 22nd Int'l Conf. on Theorem Proving in Higher Order Logics (TPHOLs 2009), pp. 23-42, Aug. 2009.

Pan, S., Dromey, R.G., "Using strongest postconditions to improve software quality." in: Software Quality and Productivity, IFIP Conference Proceedings, vol. 3, pp. 235-240, Dec. 1994.

\* cited by examiner

AUTOMATED TOOLS FOR BUILDING SECURE SOFTWARE PROGRAMS

CROSS-REFERENCE TO RELATED APPLICATIONS

This application claims priority to provisional patent application entitled, "Writing Secure C Programs with SecProve," filed on Jan. 24, 2013, and assigned U.S. Application No. 61/756,072; the entire contents of which are hereby incorporated by reference.

FIELD OF THE INVENTION

The present disclosure relates generally to preventing security flaws in computer software, and more particularly, to a computer software environment and a set of user-friendly, pushbutton tools that a developer can apply interactively to build a robust software program that satisfies selected application-specific security properties.

BACKGROUND

Many serious vulnerabilities in cyber systems arise from security flaws in software. To detect these flaws, organizations can invest enormous sums and significant human effort in testing and in certifying and accrediting the security of software. However, a serious limitation of testing, the most widely used method for obtaining evidence for certification and accreditation, is that by itself testing provides low confidence that the software is secure. Although code verification and analysis of abstract program models could significantly increase confidence in the security of software, this approach is currently viewed by those of ordinary skill in the art as too technically difficult, too expensive, and too time consuming. Therefore, obtaining high confidence that software code satisfies critical security properties remains a very difficult problem.

Recently, some commercial tools have been introduced that can be used, in addition to testing, to increase assurance in the security of software. Based on research in static analysis and similar techniques, these tools (e.g., PREfast, Coverity, Klocwork, CodeSonar, and Fortify) can detect code vulnerabilities automatically. Specifically, the class of security flaws which these tools uncover are application-independent, that is, errors and code vulnerabilities which do not depend on the application. Examples of the types of errors these tools can detect include null pointer deferences, format string problems, integer range errors, and buffer overflows. These tools have been effective in exposing and weeding out security errors in programs written in many languages, including C, Java, C++, and C#. An estimate is that the tools have exposed and led to the repair of tens of thousands of bugs, most of which traditional software testing would not have detected. One reason for the tools' success is their "pushbutton" nature, and another is user ease of understanding of the feedback they provide. To apply the tools, developers require neither significant skills nor special training.

Despite the success of these tools, both the research community and commercial tool vendors have paid far less attention to detecting a second important class of security flaws in software, application-specific errors. Application-specific errors are typically design errors that are violations of security properties specific to the application. Examples include violations of the allowed data flows and failure of a program to sanitize data areas after processing sensitive data in those areas. Some security experts estimate that, of the large number of security vulnerabilities that exist in current programs, approximately 50% belong to this second class of errors. However, detecting application-specific errors can be extremely difficult. Unlike the case of application-independent errors, where the developer can run a pushbutton tool to detect many code vulnerabilities automatically, the developer whose goal is to detect application-specific errors must define the specific security properties of interest. Specifying these properties can be a challenge, especially if the developer must express the properties in an unfamiliar language or logic.

Accordingly, a need remains in the art to develop an environment and a set of user-friendly, pushbutton tools that a developer can apply interactively to build a robust software program that satisfies developer-specified application-specific security properties.

SUMMARY OF THE INVENTION

According to one aspect of the invention, a computer implemented tool is described that includes an assertion generator module that can automatically generate assertions, which are usable to verify application-specific security properties, for a computer software program. An assertion checker module can automatically analyze the computer software program to ensure that it satisfies the application-specific security properties. A graphical user interface module can display feedback to diagnose security flaws detected in the computer software program based on the analysis by the assertion checker module. In support of these modules are a code preprocessor module that can translate source code of the computer software program into an intermediate abstract representation, and a database module that can store the generated assertions and associated data in a database. Each of the modules can provide functionality at any time during code construction of the computer software program.

According to another aspect of the invention, a method for diagnosing security flaws detected in a computer software program is provided by translating source code of the computer software program into an intermediate abstract representation. Next assertions are automatically generated, wherein the assertions are usable to verify application-specific security properties, for the computer software program, and the assertions are stored in a database. The computer software program is then automatically analyzed to ensure that it satisfies the application-specific security properties. Finally, feedback is generated to diagnose security flaws detected in the computer software program based on the analysis.

These and other aspects, objects, and features of the present invention will become apparent from the following detailed description of the exemplary embodiments, read in conjunction with, and reference to, the accompanying drawings.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description of the disclosure when considered in conjunction with the drawings, in which.

DETAILED DESCRIPTION OF EXEMPLARY EMBODIMENTS

One or more embodiments or implementations are hereinafter described in conjunction with the drawings, where like reference numerals refer to like elements throughout, and where the various features are not necessarily drawn to scale.

In general, the invention described herein is a software environment that includes a set of user-friendly, pushbutton tools that a software developer, or user, can apply interactively to build a robust software program, such as a C program or other type of computer software program, that satisfies selected application-specific security properties.

Typically application-specific security properties of code fall into well-known classes, such as sanitization (i.e., sanitization requirements, e.g., of a parameter to a routine); data flows (i.e., disallowed and guarded flows between program variables or buffers); data influence (i.e., disallowed influences, e.g., the value of variable x cannot influence variable y, that is, x cannot be used in a condition, an assignment, etc., that affects y's value); data integrity (i.e., when the value of a variable cannot be changed); data separation; access control (i.e., disallowed accesses, e.g., by procedures/regions of code); robustness (i.e., avoidance and handling of errors, exceptions, and interrupts); and non-bypassability (i.e., blocks of code, e.g., functions, required to be executed).

Unlike application-independent security properties, application-specific properties must be defined by the developer. This can require detailed knowledge of the code design. For example, to define a sanitization property, the developer must identify the variables or memory areas to be sanitized, places in the code requiring their sanitization as a precondition, and the name of the procedure that implements sanitization. To specify a desired security property in the invention, the developer can fill in a template. As an example, a template for specifying a sanitization property could provide slots for the property's ID; the data type of the item(s) to be sanitized; a sanitization predicate that can be used in assertions annotating the code; a sanitization routine plus areas it sanitizes; and names of procedures that have sanitization of certain memory areas as a precondition, together with the relevant set of memory areas. Any class of security properties may further divide into subclasses, each with its own template. For data flow, for example, two subclasses are forbidden flows between two variables, and flows between two variables restricted to flow through a third variable.

To specify the security and other properties, the user can use templates to define the required set of global security properties the software program must satisfy, e.g., the permitted data flows, and interactively construct a software program annotated with assertions expected to hold at various points in the code during program execution. The tools can check for potential violations of the global properties and developer-supplied assertions (e.g., preconditions and postconditions) while the software developer is interactively constructing the program.

The tools can provide a set of standard capabilities useful to most software developers. Specifically, these tools can provide templates for developer specification of common security properties. Furthermore, they can automatically annotate a software program interactively developed by a programmer with at least two classes of assertions. The assertions can include class 1 assertions, which are valid assertions such as those that can be automatically deduced, and class 2 assertions, which are desired, assertions whose validity must be shown. The tools can check candidate assertions in software code, where the candidate assertions are class 2 assertions either provided directly by the developer or derived from other developer-provided information such as security property specifications and contracts, where the latter can be preconditions and postconditions, for procedures, functions, and other code blocks. Finally, the tools can support developer-defined ghost code, i.e., code computing the values of ghost variables (also called logical variables), needed to express desired code properties and code assertions.

In general, to ensure the utility of the tools for software code developers, the tools can be designed for ease of use and can require minimal user training. The templates can define application specific security properties that can facilitate developer specification of these properties. To facilitate the entry of code assertions by the developer, the tools can provide an assertion language with constructs such as those already used to annotate software programs written in C (e.g., assert) and other simple constructs (e.g., ensures, requires) for which support can be easily added (e.g., a header file that provides the definitions necessary for compiling code containing the new constructs). Requiring developers to annotate their software programs with assertions is generally not unreasonable, and it is well known to one of ordinary skill in the art that annotating programs with valid assertions can provide the basis for establishing properties of programs. In fact, in current "best practices," developers sometimes already produce assertions to annotate their code.

Figure 1:
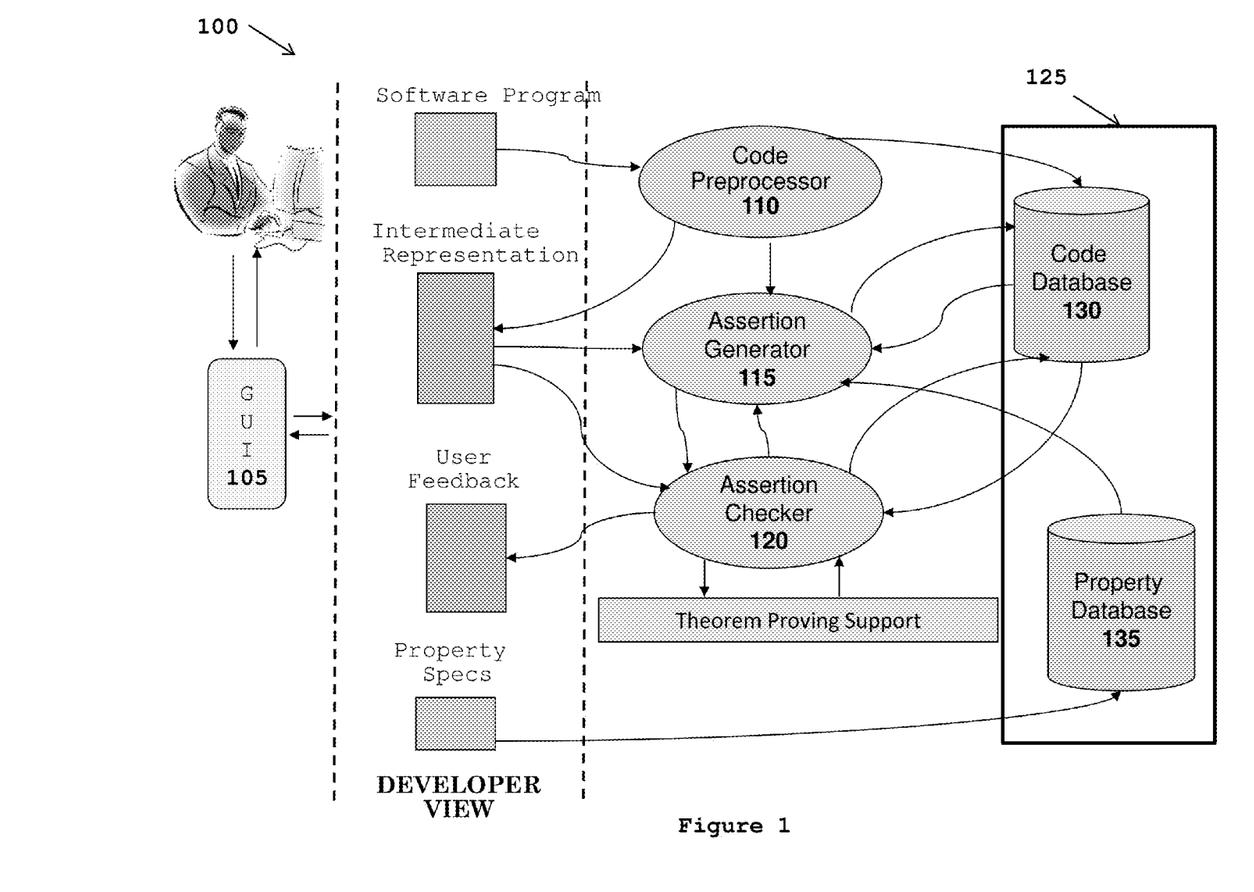
FIG. 1 is a block diagram representing a computer implemented tool in accordance with an exemplary embodiment of the invention.

FIG. 1 is a block diagram representing a computer system tool 100 in accordance with an exemplary embodiment of the invention. A graphical user interface module, or GUI, 105 can be configured to provide a graphical user interface display for what a system user interacts with when working with the system 100.

Figure 2:
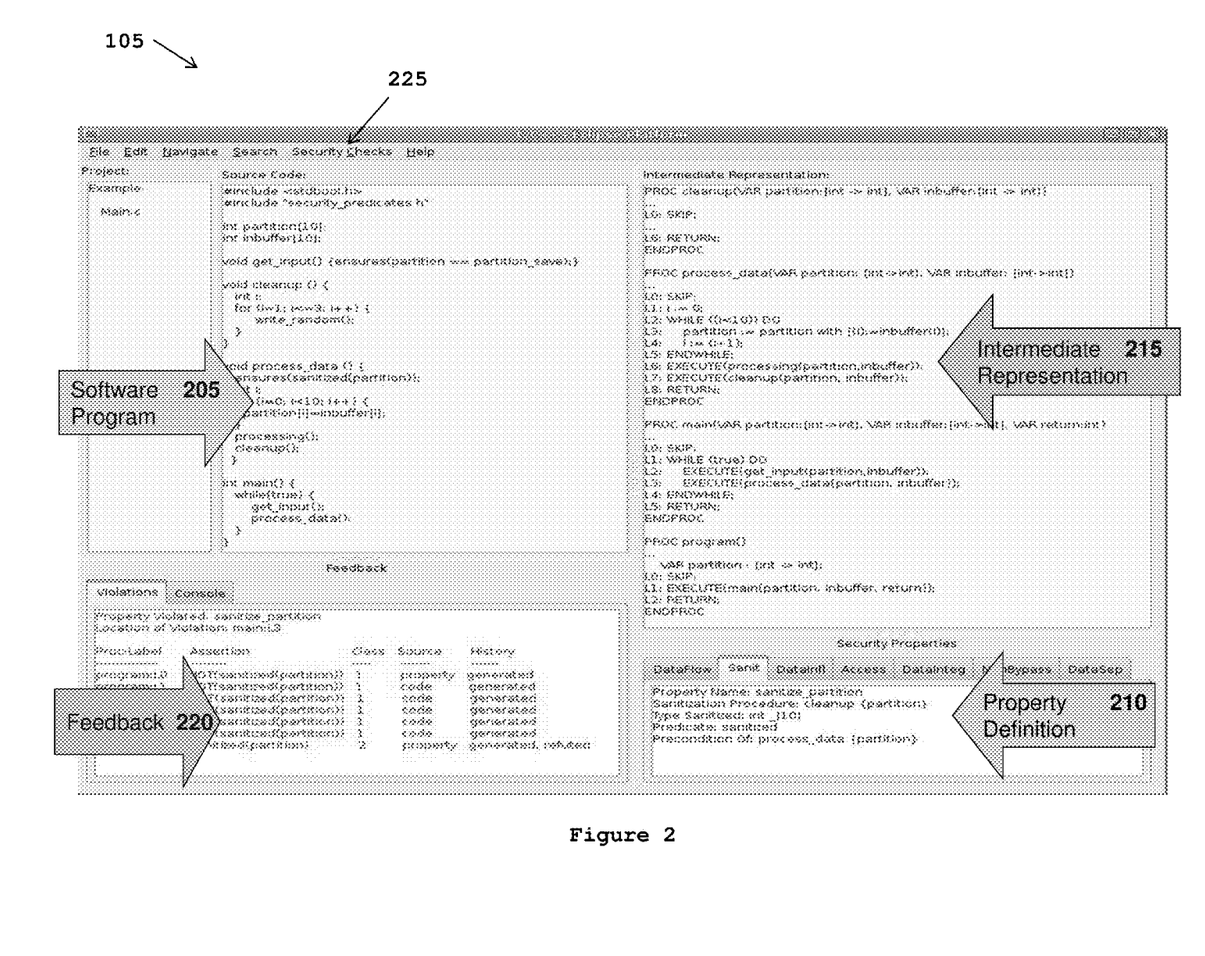
FIG. 2 is an example of a GUI in accordance with an exemplary embodiment of the invention.

FIG. 2 is an example of a GUI display 105 in accordance with an exemplary embodiment of the invention. The GUI 105 can have multiple windows for communication to and from the user. Specifically, there can be two input windows: a source code window 205 and a property definition window 210. Furthermore, there can be two output windows: an abstract code window 215 and a user feedback window 220. The GUI 105 can allow user requests through buttons, tabs, menus, mouse-clicks, and other user interactive methods.

More specifically, FIG. 2 is an example GUI display 200 that a developer might use to apply the tools. The Security Checks menu 225 of the interface can allow the developer to configure and control the security analysis (e.g., turn the security checks on and off, specify when the checks are run). Of the five windows shown in FIG. 2, the top middle window, the source code window 205, can contain the developer's software program, such as a C software program. The top right window, the intermediate representation window 215, can contain an intermediate representation of the program. The bottom right window, the property definition window 210, can be used to enter, edit and display specifications of one or more properties that the software program must satisfy. Finally, the bottom left window, the user feedback window 220, can list any violations that the tools have detected and other feedback to the developer.

As described below, instead of the source code itself, an abstract representation of the developer's code can be used for analysis. The intermediate representation window 215 of the software program can be used by the developer to view this abstract representation. Being able to view this equivalent version of the code is necessary when information is provided by the tool in terms of the intermediate representation (e.g., a list of assertions associated with a line in the intermediate representation). Access to the intermediate representation can also facilitate developer understanding of complex source code. The GUI 105 can allow a developer to highlight a region of code in the source code window 205, and the corresponding region of code in the intermediate representation window 215, can be automatically highlighted, and vice versa.

Returning to FIG. 1, the code preprocessor module 110 can be configured to create an "abstract code" representation of source code. Often computer source code, especially C code, is not formatted to fully support annotation. For example, there may be multiple commands on a line, and some constructs may represent both commands and expressions. To facilitate analysis, each distinct instruction or test should be on a separate line with a unique line identifier that can be used both for associating assertions with points in the code and for providing feedback about violations to the developer. Therefore, in an exemplary embodiment of the invention, the computer implemented tool 100 uses an intermediate, abstract representation of the source code in the LEMA algorithm specification language during code analysis. Additionally, the code preprocessor module 110 can put some information about the source and intermediate code in the Database 125. The information stored in the database 125 can include variable names, function/procedure names, function/procedure formal parameters, and other types of information about the source and intermediate code.

LEMA is an imperative language with supporting tools for transforming unformatted code into line-numbered code formatted for meaningfully associating assertions with line numbers; translating line-numbered code with associated assertions into PVS specifications and invariant lemmas; and semi-automatically proving the invariant lemmas. LEMA can support modular code verification, which relies on procedure contracts (preconditions and postconditions) to integrate the verification of the individual procedure modules. More specifically, LEMA code is formatted so that a new line begins at every point in the code where a change in the program state may occur, e.g., after an assignment, a procedure call, or a change in control location after a test. Analogous to an assert statement in C code, any assertion associated with a line of LEMA code can refer to the program state when that line is reached—and before it is executed.

In the computer implemented tool 100, an assertion generator module 115 can generate assertions from multiple sources. Specifically, code assertions associated with lines in the intermediate LEMA representation of source code can be derived from one of three sources: 1) assertions and contracts which the developer has included with the source code, 2) security properties specified by the developer (e.g., via a set of templates), and 3) inference from the LEMA code itself. Because the number of assertions associated with a given line of LEMA code may be very large, the computer implemented tool 100 does not interleave the assertions with the LEMA code, but can keep them in a separate database. Additionally, the computer implemented tool 100 does not modify or annotate the developer's source code.

The assertion generator module 115 can generate multiple classes of assertions such as Class 1 assertions, which are known-valid assertions derived from the code or from verification of some desired assertion (or, sometimes, from a property specification). Another class of assertions is Class 2 assertions, which are desired assertions, including assertions that, if proved to hold, guarantee specific security properties. The assertion generator module 115 can store the assertions in the database 125.

Another component, an assertion checker module 120 can check whether Class 2 assertions are valid, and can use Class 1 assertions in the Database 125 plus automated theorem proving. Furthermore, the assertion checker module 120 can update a validity status of assertions in the Database 125.

Finally, the computer system tool 100 can include a database module configured to store the generated assertions and other associated data for the computer implement tool 100 in a database 125. The database 125 can hold all information needed for the other components to communicate. More specifically, the database 125 can include a code database 130 and a property database 135. The code database 130 can play a central role in the computer system tool 100, and it can contain at least the following information: the current Abstract Syntax Tree (AST) for the intermediate code representation, which can incorporate line identifiers for intermediate code; the control flow graph of the (intermediate) code; assertions and other information, such as dataflow information, usable in reasoning about the code, indexed by the line identifiers; classification of assertions (Class 1 or Class 2); dependency information (including data and assertion dependencies); and traceability information (between intermediate code and source code). Furthermore, the property database 135 can contain property specifications. The property specifications can be constructed by the developer from templates, and the developer can define properties such as forbidden data flows, required sanitization, etc.

In an exemplary embodiment of the invention, the components of the computer system tool 100 can be configured to perform functions in response to user actions. These functions will be described in an example below. A user can input source code into the GUI 105. In response, the code preprocessor module 110 can translate the source code of the computer software program into an intermediate abstract representation and put code information into the Database 125. The GUI 105 can display the abstract code produced by the code preprocessor module 110. The code preprocessor module 110 can pass information about user assertions to the assertion generator module 115.

The assertion generator module 115 can be configured to automatically generate assertions, the assertions usable to verify application-specific security properties, for the computer software program. Specifically, assertion generator module 115 can generate assertions, usable to verify application-specific security properties, from at least one of developer assertions in source code of the computer software program, developer specification of application-specific security properties using a template, and an intermediate abstract representation of the computer software program. After transforming the user assertions to code assertions, the assertion generator module 115 can put them in the Database 125.

The assertion generator module 115 can forward and backward propagate code assertions in the abstract code, introducing new, logical code variables if necessary, and put the new assertions produced through propagation in the Database 125. The generated assertions can include one or more classes of assertions, such as Class 1 assertions, which are known to be valid, and Class 2 assertions, which are desired to be valid.

An assertion checker module 120 can automatically analyze the computer software program to ensure that it satisfies the application-specific security properties. Specifically, the assertion checker module 120 can check whether a certain subset of the assertions is valid. Furthermore, the assertion checker module 120 can utilize a particular subset of the known-valid assertions with automated theorem proving to determine whether the desired-valid assertions are valid.

Finally, a graphical user interface module 105 can be configured to display feedback to diagnose security flaws detected in the computer software program based on the analysis by the assertion checker module 120.

In an exemplary embodiment of the invention, the functions performed by the graphical user interface module 105, code preprocessor module 110, assertion generator module 115, assertion checker module 120, and database module 125 can be performed at any time during code construction of the computer software program. That is, the computer software program does not have to be completed for the system 100 to operate. Therefore, a developer can utilize the functions of the system 100 while the software program is being constructed.

Other functions can be performed in response to user requests. For example, when a user requests a property template, the GUI 105 can display the requested property template in the property definition window 210. Furthermore, a user may request information. For example, the information request could be to show all Class 2 assertions at a line of code, whereby the GUI 105 can call the database 125 to retrieve the requested information.

The user may also make requests for a particular action, such as checking whether a particular Class 2 assertion is valid. This function can be performed by the GUI 105 calling the assertion checker module 120. Another example of a user action is checking for violation of a property. In that instance, the GUI 105 can call the database 125 or assertion generator module 115 to get the relevant assertions, and then call the assertion checker module 120. In another function, a user can complete a displayed property template, and the GUI 105 can store the information from the completed template as a property definition in the Database 125.

Furthermore, the computer implemented tool 100 can maintain a database of information about the code and its desired security properties, for use in analyzing the code with respect to the properties. Furthermore, the tool can provide the software developer with templates for specifying common classes of application-specific security properties. Additionally, it can compute code assertions of the two classes described above: Class 1 and Class 2—where Class 1 assertions either do not require checking or have already been checked, and Class 2 assertions still require checking—and enter the assertions in the database to support code analysis. The tool can provide theorem proving support for checking Class 2 assertions. Finally, the tool can provide feedback to the developer about the state of the code development and analysis, including traceability information from the intermediate representation to the original source code to connect any detected assertion violation or property violation to its point of origin in the source code.

For code analysis, certain assertions can be automatically generated by the tool. For example, for a given property code assertions which, if valid or proved valid, ensure that the property is not violated can be automatically generated. In addition, assertions that can be deduced as valid from the code itself can be automatically generated. Finally, for every procedure call in the code, two assertions: a desired precondition and a postcondition, valid upon verification of the desired precondition, can be automatically generated, derived by instantiating the precondition and postcondition in the procedure's contract with the actual parameters in the procedure call.

Assertions (Class 2 or Class 1) associated with a particular security property can be generated as soon as that property has been specified, and entered in the database. Assertions associated with contracts (e.g., preconditions and postconditions) and assertions in the source code can be entered into the database during the translation of the source code into LEMA code. Class 1 assertions obtained by forward propagation through the LEMA code can be entered into the database at any time during or after the translation of source code to LEMA code.

Figure 3:
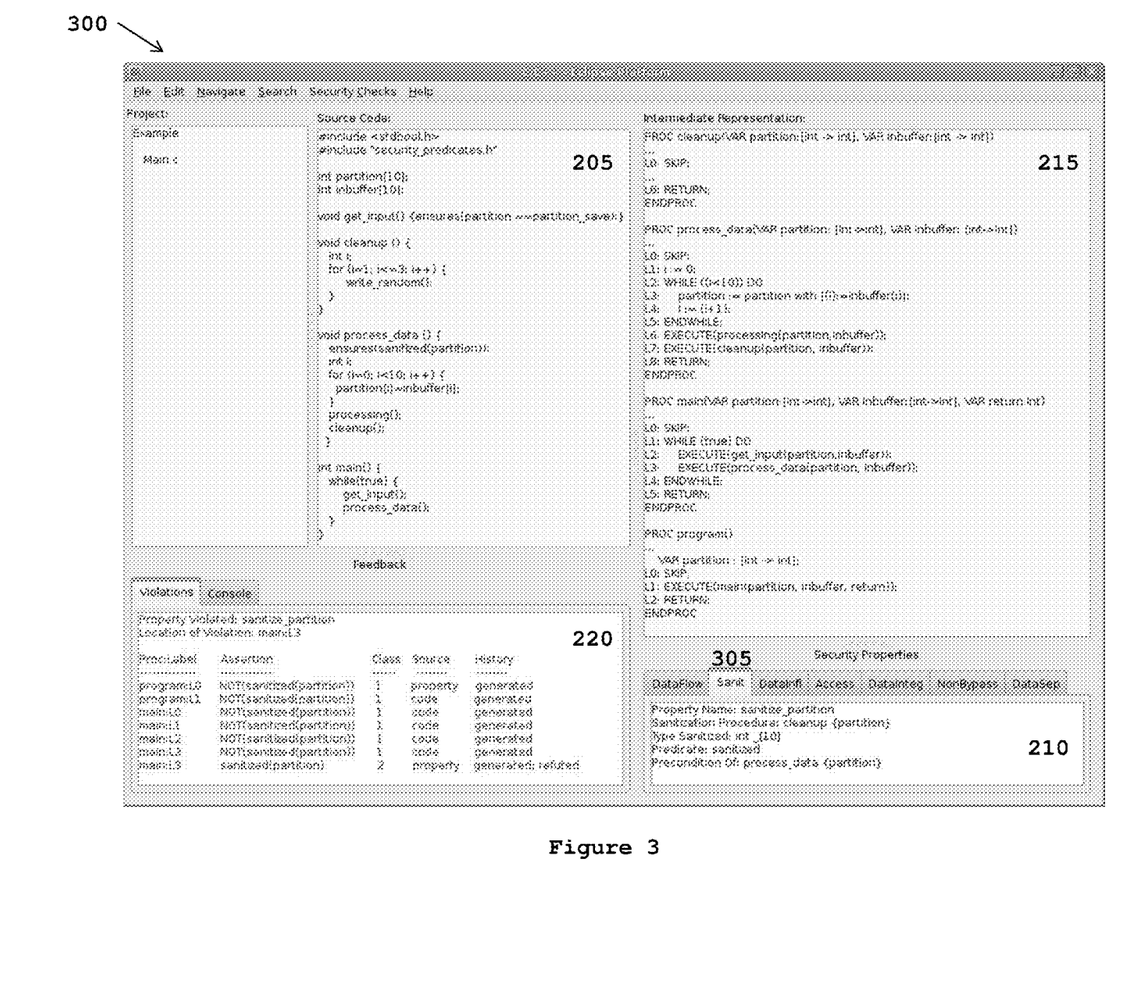
FIG. 3 is an example GUI in accordance with an exemplary embodiment of the invention.

The database can be used to provide both 1) the information needed by a verification tool (e.g., theorem prover or SMT solver) to check the validity of the Class 2 assertions and, if possible, convert them to Class 1; and 2) the information needed to display the current state of the code development and analysis to the developer. The tool can accept input, including, e.g., property specifications, new code, and commands to the analysis tools, through a GUI 105. FIG. 3, described herein below, illustrates a concept of the developer's view of an Eclipse-like GUI. Code analysis, which entails modifying the database and validity checking of assertions, can occur only upon user request through the GUI 105, because it can be expensive computationally. To handle the potential explosion in the number of assertions available for theorem proving, the developer can constrain the analysis, e.g., by focusing on certain predicates and variables.

Because a programmer can make changes at arbitrary points in the computer software source code during its development, the database 125 can be designed to facilitate such code changes. The database 125 can associate an unchanging unique line ID (distinct from the line number) with each line of intermediate abstract code when it is first generated from the source code. Each piece of information associated with a particular line of code, such as source line number, intermediate abstract code line number, variable scope information, or Class 1 or Class 2 assertions, can be associated in the database with the unique line identifier of that line of code. Thus, for example, assertions associated with a line of intermediate abstract code that is replaced or deleted can become inaccessible. A change in the source code can produce a corresponding change in the intermediate representation, and may require re-analysis of the code. To minimize the re-analysis effort, stored procedures that manage the database can be used by the tool to maintain as much of the information associated with unaltered lines of intermediate abstract code as possible.

FIG. 3 is an example GUI 300 in accordance with an exemplary embodiment of the invention. FIG. 3 will be utilized to illustrate how a developer can use the computer implemented tool to check a sanitization property and a developer-supplied contract for a simple computer software, specifically C, program. In FIG. 3, source code window 205 of the GUI 300 displays the current C code, which is not yet complete. The function in the source code window 205, get_input, is only a stub, and no code yet exists for the functions "processing" and "write_random." Because it is incomplete, this program will not compile. However, the computer implemented tool 100, by contrast, can analyze this partial program, regardless of whether it is completed to the point where it can be compiled.

The computer implemented tool 100 can provide two methods for developers to specify desired properties: 1) contracts and assertions placed directly in the C code (described later in this example), and 2) templates for specifying application-specific security properties. Displayed in the property definition window 210 is a sanitization property template 305. In this example, the security property of interest is that sanitized(partition) holds whenever the procedure process data begins execution. To define this property using the template, the developer can provide at least the following: 1) a name for the property (sanitize_partition); 2) the name of a routine that performs sanitization (cleanup), together with the set of global variables or formal parameters it sanitizes ({partition}); 3) the data type subject to sanitization (int_[10], i.e., integer arrays of size 10); 4) the name of a predicate that indicates whether a data area of the given data type is sanitized (sanitized); and 5) a list of those procedures requiring as a precondition that certain data areas are sanitized (process_data), together with the set of global variables or formal parameters assumed sanitized ({partition}). The template can be instantiated as many times as necessary to cover every data area for which sanitization is a concern, e.g., because it may hold sensitive data.

As noted in Section 3, the computer implemented tool 100 supports developer-supplied annotations in the form of function contracts and assertions at individual lines of code. While C program assert statements can be used to annotate individual lines of code, the computer implemented tool 100 can provide two further annotation constructs, requires and ensures, to respectively capture contract preconditions and postconditions. The computer implemented tool 100 expects a contract for a C function, if provided by the developer, to appear immediately after the opening curly brace for the function body. Placing the contract at the beginning of the function can allow the contract to be used in analysis as early as possible, including situations in which the code for the function is incomplete or missing entirely. A function with only a function declaration and a contract is called a stub. Contracts associated with stubs can be used in the analysis of other routines, with proof that the stub satisfies its contract postponed until the code for the stub is developed. The example C code in FIG. 3 includes a developer-supplied contract ensures (sanitized(partition)) for process_data indicating that sanitized(partition) is desired to hold at the end of process_data. The computer implemented tool 100 can automatically generate a header file, security_predicates.h, containing trivial definitions (returning true) for requires and ensures. From the property templates, the computer implemented tool 100 can automatically generate trivial definitions in security_predicates.h for any predicates (e.g., sanitized) declared in property specifications, so that the developer can use these predicates in annotations. This purpose of this header file is to allow the C code to compile. To allow ensures annotations to refer to both the beginning and ending values of a variable passed to a routine as an actual parameter, the computer implemented tool 100 can automatically add to the header file the declaration of a variable x_save for each global variable or formal parameter x in the program. This variable refers to x's value when a routine is first entered. Thus, in the C program in FIG. 3, partition_save can be, and is, used in the get_input stub's contract ensures (partition==partition_save) to indicate that get_input does not change the value of partition. Because this is in a stub, no proof that the contract is valid is required until the stub is expanded to include code.

The first step of the computer implemented tool's 100 verification process is to translate the C code into an equivalent program in LEMA. The GUI 105 displays the LEMA representation of the C code in the intermediate representation window 215. To display all of the sanitization-relevant code in FIG. 3 at the same time, the LEMA representation of get_input has been removed and portions of the LEMA representation of other procedures have been replaced by ellipses. During the generation of the LEMA intermediate representation, information is added to the database (e.g., about the developer-supplied assertions and contracts). The security properties specified using the templates are also added to the database 125. Each property is assigned a unique property ID used as a key in the database 125 to associate the property with assertions that will be generated from the property. Next, for each specified property, the assertion generator 115 processes the property specification and associates, with both the property and appropriate code locations, (possibly some Class 1 assertions, along with) Class 2 assertions which, if they all hold, are sufficient to guarantee the property. All assertions are stored in the database 125 by associating (but not interleaving) them with the LEMA code. The specification of property sanitize_partition implies that, for satisfying it, sanitized(partition) is a required precondition for process_data. Therefore, the computer implemented tool 100 will associate a Class 2 assertion stating sanitized(partition) with the call to process_data on line L3 of main, and similarly for any other calls to process_data in the program. The assertion generator also enters Class 2 assertions corresponding to any developer-provided contracts and assertions. In the example, to ensure that the developer-provided contract for process_data is satisfied, the computer implemented tool 100 must check that partition has been sanitized at line L8 of process_data, and for this purpose will associate a Class 2 assertion (call it B) stating sanitized(partition) with line L8 of process_data in the database.

Because the specification of the property sanitize_partition designates cleanup as its sanitization routine and {partition} as the set of global variables or parameters sanitized by cleanup (and because the C-to-LEMA translator transforms the C code global variable partition into a local variable of the top level LEMA procedure program that is passed to all other LEMA procedures as a parameter), the assertion generator 115 associates a Class 1 assertion stating sanitized(partition) with any line of code, outside of cleanup itself, that immediately follows a call to cleanup, including line L8 in process_data. In addition, because partition is considered "not sanitized" when it is first defined, a Class 1 assertion stating NOT (sanitized(partition)) is associated with line L0 in program. In the code outside cleanup, code locations immediately following places where the value of partition may be changed are tagged with a Class 1 assertion stating NOT (sanitized(partition)). Thus, in process_data, such assertions are associated with L4, following an assignment to partition at L3, and with L7, following a call to processing at L6. Note that because the behavior of processing with respect to partition is unknown, it must be assumed that partition is not sanitized after processing executes.

Let A be the Class 1 assertion associated with line L8 in process data. Since A is equivalent to the Class 2 assertion B at L8 of process data, B can be converted to Class 1 and marked as proved. This proves that the developer-supplied contract for process_data holds. The dependency of B's Class 1 status on A is recorded in the database so that if updates to the code eliminate A, B will revert to Class 2 in the database.

By forward propagation of the Class 1 assertion stating NOT (sanitized(partition)) associated with line L0 in program, the assertion generator 115 associates equivalent Class 1 assertions both with line L1 of program, which calls main, and line L0 of main. Forward propagation of this latter assertion associates equivalent Class 1 assertions with L1 and L2 of main on the first pass through the loop, and similarly with L3 of main, because get_input does not change partition. But the generated Class 1 assertion at L3 refutes the Class 2 assertion stating sanitized(partition) associated with L3 (see above) generated from the specification of sanitize_partition. The user feedback window 220 can display, as LEMA feedback to the developer, details of the resulting property violation, including a trace of the assertions that lead to the violation. Clicking on a line of LEMA code presents the user with a menu allowing additional feedback, e.g., a display of associated assertions and highlighting corresponding lines of C code.

The above examples are merely illustrative of several possible embodiments of various aspects of the present disclosure, wherein equivalent alterations and/or modifications will occur to others skilled in the art upon reading and understanding this specification and the annexed drawings. In particular regard to the various functions performed by the above described components (processor-executed processes, assemblies, devices, systems, circuits, and the like), the terms (including a reference to a "means") used to describe such components are intended to correspond, unless otherwise indicated, to any component, such as hardware, processor-executed software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been illustrated and/or described with respect to only one of several implementations; such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

Portions of the invention can comprise a computer program that embodies the functions described herein. Furthermore, the modules described herein, such as the code preprocessor module, assertion generator module, assertion checker module, and database module, can be implemented in a computer system that comprises instructions stored in a machine-readable medium and a processor that executes the instructions. However, it should be apparent that there could be many different ways of implementing the invention in computer programming, and the invention should not be construed as limited to any one set of computer program instructions. Further, a skilled programmer would be able to write such a computer program to implement an exemplary embodiment based on the flow charts and associated description in the application text. Therefore, disclosure of a particular set of program code instructions is not considered necessary for an adequate understanding of how to make and use the invention. The inventive functionality of the claimed computer implemented tool is explained herein in more detail read in conjunction with the figures illustrating the program flow.

It should be understood that the foregoing relates only to illustrative embodiments of the present invention, and that numerous changes may be made therein without departing from the scope and spirit of the invention as defined by the following claims.

The invention claimed is:

1. A computer implemented method for providing feedback concerning application-specific security properties for a computer software program, comprising the steps of:
   automatically generating assertions that are desired to be valid, via one or more processors, based on desired application-specific security properties, validity of the assertions being usable to verify the application-specific security properties for the computer software program;
   automatically generating assertions that are known to be valid, via said or another one or more processors, based on the computer software program and received desired application-specific security properties;
   automatically analyzing the computer software program source code, via said or another one or more processors, to determine whether the computer software program satisfies the application-specific security properties, based on the automatically generated assertions that are desired to be valid, in combination with the automatically generated assertions that are known to be valid;
   generating feedback, via said or another one or more processors and based on determinations made in the step of automatically analyzing the computer software program, indicating instances of failure of the computer software program to satisfy the application-specific security properties; and
   displaying the feedback with a graphical user interface.

2. The method of claim 1, wherein the step of automatically analyzing the computer software program includes the step of translating source code of the computer software program into an intermediate abstract representation via said or another one or more processors.

3. The method of claim 1, wherein the steps of generating assertions comprise generating both assertions that are known to be valid and assertions that are desired to be valid, from at least one of: developer assertions in source code of the computer software program, developer specification of application-specific security properties using a template, code of the computer software program, or an intermediate abstract representation of the computer software program.

4. The method of claim 1, further comprising the step of storing the generated assertions, code of the computer software program, intermediate abstract representation of the code, and associated data in a database by line identifiers, thereby permitting incremental parsing during development of the computer software program.

5. The method of claim 1, wherein the step of automatically analyzing the computer software program includes generating assertions that are known to be valid provided certain assertions desired to be valid can be proved valid.

6. The method of claim 1, wherein the step of automatically analyzing the computer software program comprises checking whether a certain subset of the assertions are valid.

7. The method of claim 1, wherein the step of automatically analyzing the computer software program comprises utilizing automated theorem proving performed on said or another one or more processors and a particular subset of the assertions that are known to be valid to determine whether the assertions that are desired to be valid are valid.

8. The method of claim 1, wherein the step of automatically generating assertions is performed during code construction of the computer software program.

9. The method of claim 1, wherein the step of automatically analyzing the computer software program is performed during code construction of the computer software program.

10. The method of claim 1, wherein the step of generating feedback is performed during code construction of the computer software program.

11. A computer-implemented system having a non-transitory computer-readable medium comprising instructions stored thereon, comprising:
   hardware processor configured to automatically generate, for a computer software program, both assertions that are desired to be valid, based on desired application-specific security properties, the validity of the assertions being usable to verify application-specific security properties, and assertions known to be valid, based on the computer software program and desired application-specific security properties;

said or another hardware processor configured to automatically analyze the computer software program source code and determine whether the computer software program satisfies the application-specific security properties, based on the automatically generated assertions that are desired to be valid in combination with the automatically generated assertions that are known to be valid; and said or another hardware processor configured to display feedback to indicate instances of failure of the computer software program to satisfy the application-specific security properties based on said automatic analysis of the computer software program source code.

12. The system of claim 11, further comprising said or another hardware processor configured to translate source code of the computer software program into an intermediate abstract representation.

13. The system of claim 11, wherein said or another hardware processor is configured to generate assertions, usable to verify application-specific security properties, from at least one of: developer assertions in source code of the computer software program, developer specification of application-specific security properties using a template, and an intermediate abstract representation of the computer software program.

14. The system of claim 11, further comprising said or another hardware processor configured to store the generated assertions and associated data in a database.

15. The system of claim 11, wherein said or another hardware processor is configured to automatically analyze the computer software program to ensure that it satisfies the application-specific security properties by checking whether all assertions in a certain subset of the assertions are valid.

16. The system of claim 11, wherein said or another hardware processor is configured to automatically analyze the computer software program to ensure that it satisfies the application-specific security properties by utilizing a particular subset of known-valid assertions with automated theorem proving to determine whether desired-valid assertions are valid.

17. The system of claim 11, wherein said or another hardware processor is configured to automatically generate assertions during code construction of the computer software program.

18. The system of claim 11, wherein said or another hardware processor is configured to automatically analyze the computer software program during code construction of the computer software program.

19. The system of claim 11, wherein said or another hardware processor is configured to display feedback to diagnose security flaws detected in the computer software program based on said automatic analysis of the computer software program source code during code construction of the computer software program.

20. The method of claim 5, wherein at least a portion of the assertions that are known to be valid are automatically generated by said or another one or more processors using forward propagation of assertions.

21. The method of claim 5, further comprising the step of generating verification conditions for assertions that are desired to be valid using forward propagation from an assertion that is known to be valid.

22. The method of claim 1, further comprising the step of generating a header file for the computer software program containing placeholder definitions of property-derived predicates that may appear in developer assertions in source code, thereby allowing code of the computer software program to compile.

* * * * *